(12) United States Patent
Joong et al.

(10) Patent No.: US 6,825,581 B1
(45) Date of Patent: *Nov. 30, 2004

(54) LINEAR MOTOR AND PRODUCTION METHOD THEREFOR

(75) Inventors: Kim Houng Joong, Hitachi (JP); Hiroshi Katayama, Hitachinaka (JP); Kohji Maki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/959,615

(22) PCT Filed: Apr. 27, 2000

(86) PCT No.: PCT/JP00/02808

§ 371 (c)(1),
(2), (4) Date: Nov. 1, 2001

(87) PCT Pub. No.: WO00/69051

PCT Pub. Date: Nov. 16, 2000

(30) Foreign Application Priority Data

May 7, 1999 (JP) .......................................... 11-127081
Feb. 24, 2000 (JP) ...................................... 2000-052265

(51) Int. Cl.7 ............................................. H02K 41/03
(52) U.S. Cl. ..................................... 310/12; 310/49 R
(58) Field of Search .......................... 310/12–14, 49 R, 310/257

(56) References Cited

U.S. PATENT DOCUMENTS

| | | | | |
|---|---|---|---|---|
| 4,254,350 A | * | 3/1981 | Miroshnichenko et al. | ... 310/13 |
| 4,542,311 A | * | 9/1985 | Newman et al. | ............... 310/13 |
| 4,695,777 A | * | 9/1987 | Asano | .......................... 318/130 |
| 4,703,297 A | | 10/1987 | Nagasaka | .................... 355/222 |
| 4,945,268 A | * | 7/1990 | Nihei et al. | ..................... 310/12 |
| 5,066,897 A | * | 11/1991 | Ueda et al. | .................. 318/135 |
| 5,654,596 A | * | 8/1997 | Nasar et al. | ................... 310/12 |
| 6,078,114 A | * | 6/2000 | Bessette et al. | ................ 310/12 |
| 6,448,733 B1 | * | 9/2002 | Joong et al. | ................. 318/649 |
| 6,467,584 B2 | * | 10/2002 | Yamamoto et al. | ......... 187/316 |
| 6,541,880 B2 | * | 4/2003 | Okada et al. | .................. 310/12 |
| 6,548,919 B2 | * | 4/2003 | Maki et al. | .................... 310/12 |
| 6,548,920 B2 | * | 4/2003 | Joong et al. | ................... 310/12 |
| 2002/0043879 A1 | * | 4/2002 | Joong et al. | ................... 310/12 |
| 2002/0050743 A1 | * | 5/2002 | Okada et al. | .................. 310/12 |
| 2002/0053832 A1 | * | 5/2002 | Akita et al. | .................... 310/12 |
| 2002/0053833 A1 | * | 5/2002 | Kim et al. | ..................... 310/12 |
| 2002/0053834 A1 | * | 5/2002 | Maki et al. | .................... 310/12 |
| 2002/0053835 A1 | * | 5/2002 | Joong et al. | ................... 310/12 |
| 2002/0070612 A1 | * | 6/2002 | Joong et al. | ................... 310/12 |

FOREIGN PATENT DOCUMENTS

| | | | | |
|---|---|---|---|---|
| DE | 39 15 623 C1 | 12/1990 | | |
| EP | 334645 A1 | * | 9/1989 | .......... H02K/41/03 |
| JP | 63-310361 | 12/1988 | | |

* cited by examiner

*Primary Examiner*—Nicholas Ponomarenko
*Assistant Examiner*—David W. Scheuermann
(74) *Attorney, Agent, or Firm*—Antonelli, Terry, Stout & Kraus, LLP (57) ABSTRACT

To reduce the magnetic flux leakage through the gap between magnetic pole teeth of an armature so as to reduce the magnetic attraction force generated between the armature and a needle, an armature unit is provided with two magnetic poles 1 and 2, on the top of which are magnetic pole teeth 11a, 21b, and 22a protruding toward the opposing magnetic pole, where the magnetic pole teeth of the magnetic pole 1 are arranged at two heights, upper and lower, and the magnetic pole teeth of the opposing magnetic pole 2 are arranged at two heights, upper and lower, so that the magnetic flux flows upward and downward alternately between the upper and lower magnetic pole teeth. The needle 6 equipped with permanent magnetic moves relatively in the gap 8 between the upper and lower magnetic pole surfaces of the armature unit.

10 Claims, 6 Drawing Sheets

Fig.6a  (A) PHASE A-PHASE B-PHASE A-PHASE B
ARRANGEMENT OF ARMATURE UNIT

Fig.6b  (B) PHASE A-PHASE A-PHASE B-PHASE B
ARRANGEMENT OF ARMATURE UNIT

(PRIOR ART)

US 6,825,581 B1

LINEAR MOTOR AND PRODUCTION METHOD THEREFOR

BACKGROUND OF THE INVENTION

The present invention relates to a linear motor to and a method of manufacture thereof; and more particularly, the invention relates to a linear motor that is provided with an armature on which a coil is to be wound and magnetic poles with pairs of opposing upper and lower magnetic pole teeth, which are arranged alternately.

It has been known conventionally that, if the magnetic field of a linear motor is generated by a permanent magnet, high thrust can be attained with a compact construction. Thus, various constructions have been proposed for a linear motor.

Japanese Application Patent Laid-Open Publication No. SHO 63-310361 discloses a linear pulse motor that can be manufactured at a lower cost by means of a simplified lead treatment. While details of this motor are described in the Publication, a brief description of the construction of the linear motor follows with reference to FIG. 12.

Figure 12:
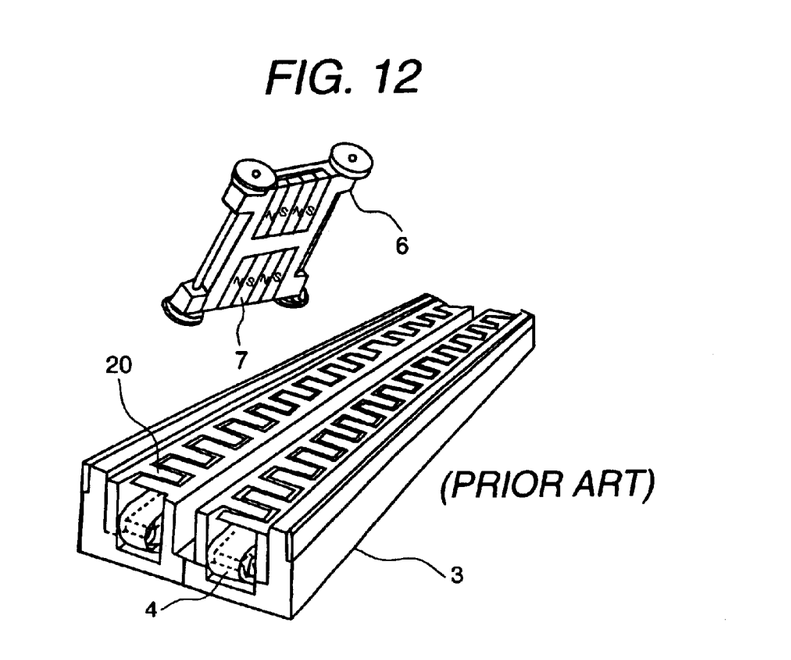
FIG. 12 is a schematic diagram of linear pulse motor according to the prior art.

Inside a straight armature 3 having a U-shaped section, two yokes are fixed in parallel, which also have a U-shaped section, and a coil 4 is wound longitudinally on the bottom of each yoke. Each yoke is equipped with two magnetic poles standing upright. A magnetic pole plate is fixed on the top of each magnetic pole, where magnetic pole teeth 20 protrude at an equal interval toward the other magnetic pole plate, thus alternating the magnetic pole teeth 20 and forming a crow pole type magnetic pole surface. A needle 6, which is so held as to be able to move along the longitudinal direction of the armature 3, is equipped with two sets of permanent magnets 7 in parallel with each other so as to face the magnetic pole surface through an air gap, and the permanent magnets 7 are so magnetized that the polarity alternates at the same interval as the protruding teeth of the magnetic pole plate. With this construction, when a two-phase sine wave current with 90-degree phase shift is supplied to the coil 4 wound on each yoke, the needle 6 moves on the armature 3 along the longitudinal direction in response to the well-known linear motor principle.

According to the prior art, while a linear motor can be manufactured at a lower cost by means of a simplified construction and a simplified lead treatment, it involves the following problems. That is, because the two magnetic poles and magnetic pole plates provided for the armature 3 are constructed as explained above, the magnetic flux leakage through the gaps between the alternating magnetic pole teeth 20 protruding from the top of the two magnetic poles is large as a whole. As a result, the thrust of the motor is lower as compared to the exciting current. In addition, since a magnetic attraction force acts between the armature 3 and the needle 6 in one way, a greater burden is imposed on the support mechanism of the needle 6, and, consequently, a strain is caused in the construction, resulting in various problems.

SUMMARY OF THE PRESENT INVENTION

An object of the present invention is to provide a linear motor and a method of manufacture thereof, wherein the flux leakage through the gaps between the magnetic pole teeth of the magnetic pole plates is reduced so that the magnetic attraction force between the armature and the needle is minimized.

In order to achieve the above object, there is provided a linear motor comprising an armature and a needle with magnetism, the armature being equipped at least with a magnetic pole of a first polarity having a first opposing section and another magnetic pole of a second polarity having a second opposing section, and the needle being placed between the first opposing section and the second opposing section.

There is also provided a method of manufacture of a linear motor comprising an armature and a needle having magnetic poles; wherein an armature core to be wound with a coil, magnetic poles on both sides, and a magnetic pole unit integrated from upper magnetic pole teeth and opposed lower magnetic pole teeth are manufactured separately from laminated steel plate to form an armature unit, and an armature equipped with a magnetic pole of a first polarity having a first opposing section and another magnetic pole of a second polarity having a second opposing section is constructed by assembling the separately manufactured armature units.

DETAILED DESCRIPTION OF THE PREFERRED EMBODIMENT

A preferred embodiment of the present invention will be described hereunder with reference to the drawings.

Figure 1:
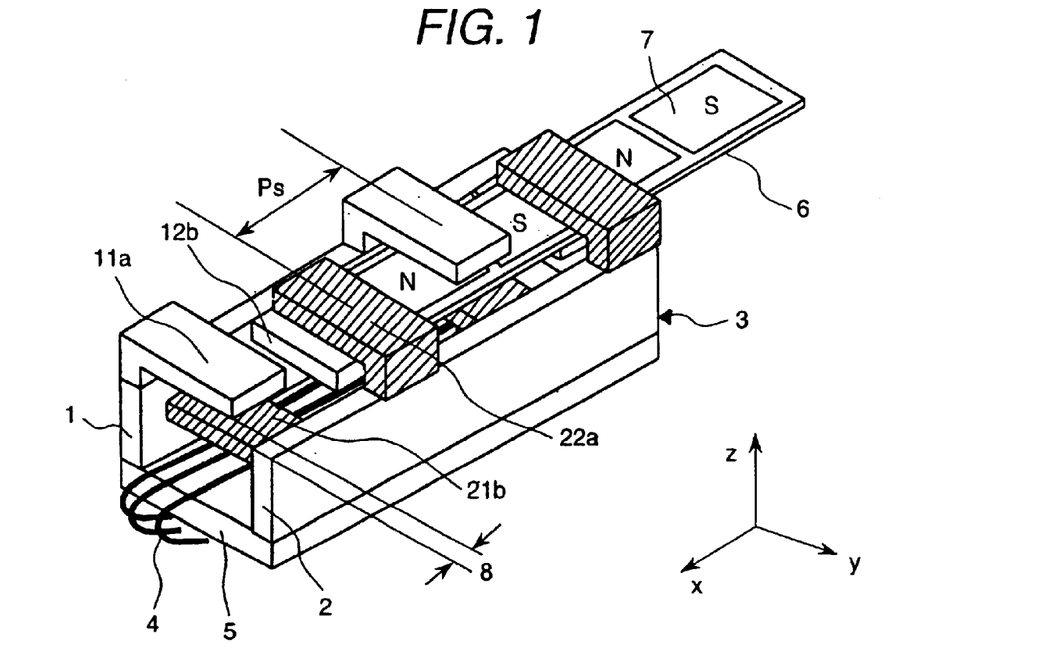
FIG. 1 is a schematic perspective view of a linear motor according to an embodiment of the present invention.
Figure 2:
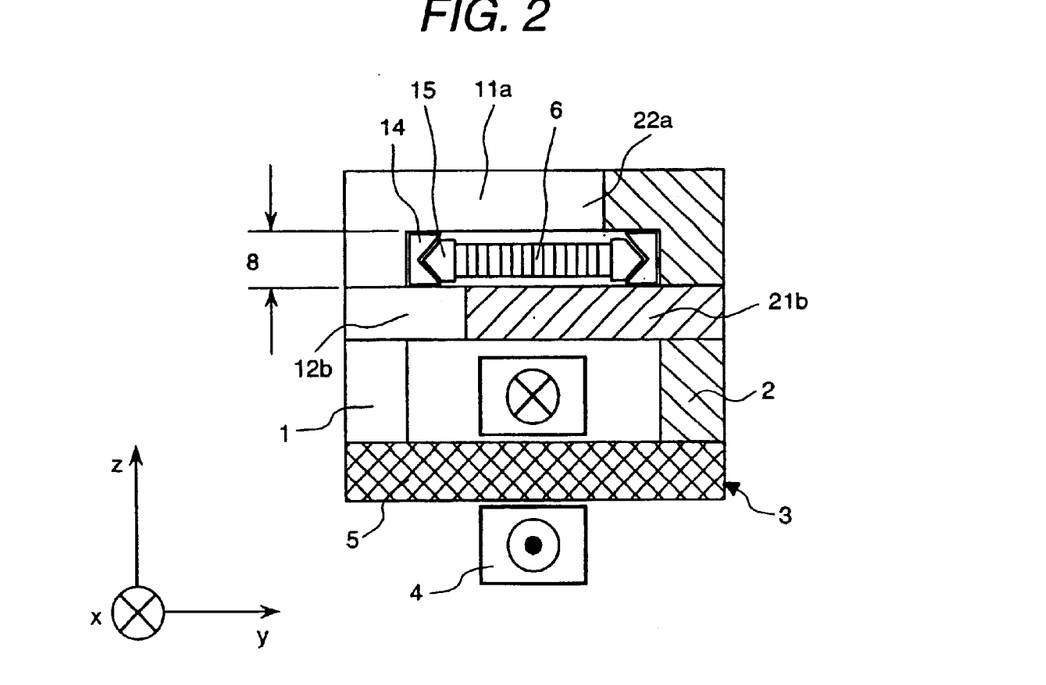
FIG. 2 is a sectional view of the linear motor of FIG. 1.

FIG. 1 is a diagram of a linear motor according to an embodiment of the present invention, and FIG. 2 shows a sectional view thereof.

In FIG. 1, the linear motor comprises a magnetic pole 1 having an upper magnetic pole tooth 11a and a lower magnetic pole tooth 12b, another magnetic pole 2 having a lower magnetic pole tooth 21b and an upper magnetic pole tooth 22a, an armature 3 having an armature coil 4 and an armature core 5, and a needle 6 having permanent magnets 7. A gap 8 is formed between the upper magnetic pole tooth 11a of the magnetic pole 1 and the lower magnetic pole tooth 21b of the magnetic pole 2 (as well as between the lower magnetic pole tooth 12b of the magnetic pole 1 and the upper magnetic pole tooth 22a of the magnetic pole 2). Ps denotes a center-to-center pole pitch between two adjacent magnetic pole teeth on the same upper or lower side. The armature 3 is equipped with the magnetic poles 1 and 2 on both sides of the armature core 5 at the bottom, and the armature coil 4 is wound longitudinally on the armature core 5, which is a long and straight core having a U-shaped section. Thus, the armature 3 includes the two magnetic poles 1 and 2.

While the magnetic pole 1 is equipped an its top with an-upper magnetic pole tooth 11a, a lower magnetic pole tooth 12b, an upper . . . , protruding towards the magnetic pole 2, the magnetic pole 2 is equipped on its top with a lower magnetic pole tooth 21b, an upper magnetic pole tooth 22a, a lower . . . , protruding towards the magnetic pole 1. That is, the protruding magnetic pole teeth of the magnetic pole 1 are arranged at two heights, upper and lower, so that the (2n−1)-th tooth (n=1, 2, 3, . . . ) protrudes as an upper one and the (2n)-th tooth (n=1, 2, 3, . . . ) protrudes as a lower one. In contrast to the magnetic pole 1, the magnetic pole teeth of the magnetic pole 2 are arranged also at two heights so that the 2n=1)-th tooth (n=1, 2, 3, . . . ) protrudes as a lower one and the (2n)-th tooth protrudes as an upper one. When all of the upper magnetic pole teeth of the magnetic pole 1 and magnetic pole 2 are defined as an upper magnetic pole surface and all of the lower magnetic pole teeth as a lower magnetic pole surface, this construction serves to provide two magnetic pole surfaces, upper and lower, where the opposing magnetic pole teeth of the magnetic pole 1 and magnetic pole 2 are alternated.

Here, a pole tooth pair consisting of a first upper magnetic pole tooth 11a and a lower magnetic pole tooth 12b is defined as a first opposing section, and a pole tooth pair consisting of a second lower magnetic pole tooth 21b and an upper magnetic pole tooth 22a is defined as a second opposing section. Consequently, the armature is so constructed that the (2n=1)-th pair appears as the first opposing section and the (2n)-th pair appears as the second opposing section.

When a constant gap 8 is provided between the upper magnetic pole tooth and lower magnetic pole tooth of each opposing section and a needle having magnetism is inserted through the gap 8, there is provided a construction where the needle is held between the first opposing section and the second opposing section.

With the above construction, there is provided an armature unit where the magnetic flux flows upward and downward alternately between the upper and lower magnetic pole teeth in the gap between the upper and lower magnetic pole teeth of each opposing section of a linear motor according to the present embodiment, and the needle moves relatively through the gap.

In FIG. 2, a support mechanism 14 (on the armature side) supports the relatively moving needle 6 on the armature 3 side, and a support mechanism 15 (on the needle side) supports the relatively moving needle 6 on the needle 6 side. The needle 6 supported by the support mechanisms 14 and 15 moves relatively in the gap 8 as if running in a tunnel.

In a linear motor according to the present embodiment, there are provided two different magnetic pole teeth, upper and lower, of the armature 3, and the needle 6 moves relatively between the upper and lower magnetic pole teeth. Provided that the distances from the center of the needle 6 to the upper and lower magnetic pole teeth are equal, the attraction force acting between the needle 6 and the upper magnetic pole teeth is equal to, but the direction is opposite to, the attraction force acting between the needle 6 and the lower magnetic pole teeth. Thus, the attraction forces cancel each other so as to become zero as a whole. As a result, the attraction force between the needle 6 and the magnetic pole teeth of the armature 3 can be reduced, and, accordingly, the burden on the support mechanisms 14 and 15 can be minimized.

Figure 3:
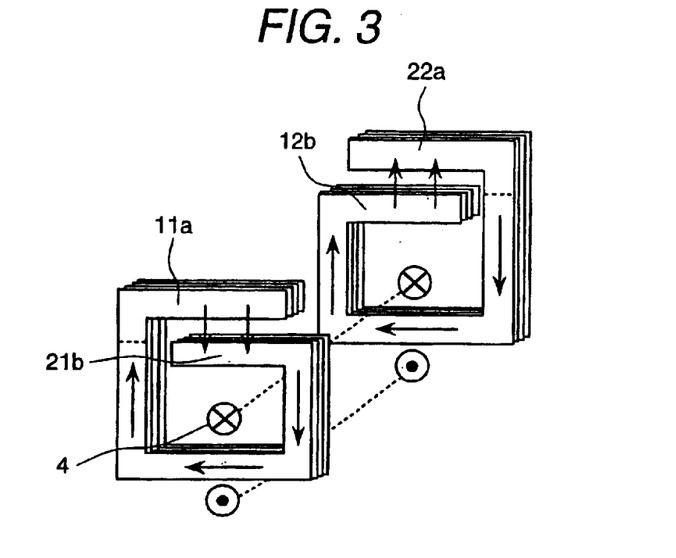
FIG. 3 is a conceptual diagram showing the magnetic flux flow in the linear motor of FIG. 1.

FIG. 3 is a conceptual diagram showing the magnetic flux flow in a linear motor according to the present embodiment. When the armature coil 4 is excited, and if the upper and lower magnetic pole teeth of the magnetic pole 1 are magnetized to N polarity, the upper and lower magnetic pole teeth of the magnetic pole 2 are magnetized to S polarity. When this happens, the magnetic flux flows from the upper magnetic pole tooth 11a of the magnetic pole 1 to the lower magnetic pole tooth 21b of the magnetic pole 2, and, similarly, it flows from the lower magnetic pole tooth 12b of the magnetic pole 1 to the upper magnetic pole tooth 22a of the magnetic pole 2. As a result, the direction of the magnetic flux flow in the gap 8 between the upper and lower magnetic pole surfaces reverses at every magnetic pole pitch.

In a linear motor according to the present embodiment, because of the above, the magnetic flux flows from the upper magnetic pole teeth toward the lower magnetic pole teeth through the N pole and S pole of the permanent magnet of the needle 6 and also from the lower magnetic pole teeth toward the upper magnetic pole teeth through the S pole and N pole of the permanent magnet of the needle 6. As a result, the magnetic path of a magnetic circuit of effective fluxes becomes shorter, the magnetic resistance becomes lower, the effective magnetic flux increases, and the magnetic flux leakage decreases.

On the other hand, since a conventional crow pole type linear motor has only a single magnetic pole surface, the magnetic flux from the N pole teeth of the armature 3 flows across the S pole and N pole of the permanent magnet of the needle 6 and returns to the S pole teeth of the armature 3. Hence, the magnetic path of a magnetic circuit of effective fluxes becomes longer. As a result, in a conventional crow pole type linear motor, the magnetic resistance increases and the magnetic flux leakage not flowing through the permanent magnet of the needle 6, but flowing directly from an N pole tooth to an adjacent S pole tooth of the armature 7, increases.

Figure 4:
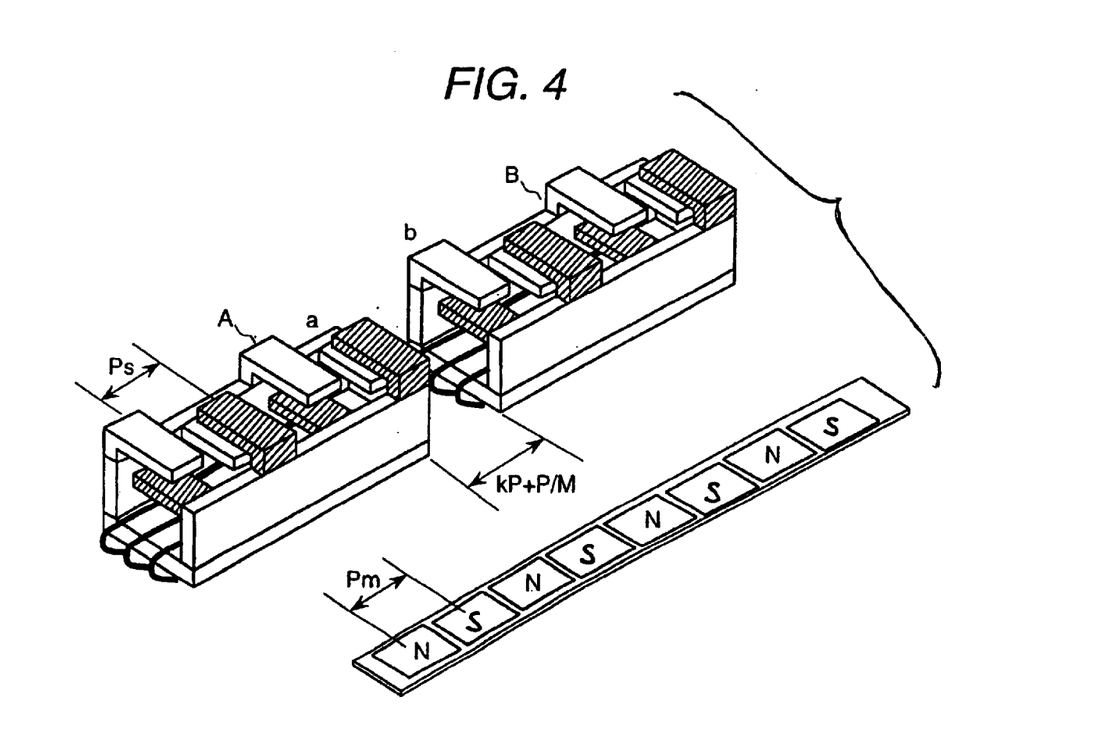
FIG. 4 is a perspective view of a linear motor comprising two armature units of the present invention in series.

Next, a linear motor comprising a multiple of the armature units of FIG. 1, arranged in series or in parallel, will be explained hereunder. FIG. 4 shows a linear motor comprising two of the armature units of FIG. 1 arranged in series.

Generally, in FIG. 4, an armature unit A and an armature unit B are arranged in series so that the pitch between the magnetic pole tooth "a" of the armature unit A and the magnetic pole tooth "b" of the adjacent armature unit B is (K·P+P/M) {(K=0, 1, 2, . . . ), (M=2, 3, 4, . . . )}. P represents the magnetic pole pitch (either the armature magnetic pole pitch Ps or needle magnetic pole pitch Pm is selected), and M represents the phase of the motor. Namely, K=3 and M=2 the arrangement of in FIG. 4.

In FIG. 4, the armature magnetic pole pitch Ps can be either equal to or different from the needle magnetic pole pitch Pm. Making the armature magnetic pole pitch Ps equal to the needle magnetic pole pitch Pm is, effective for reducing the thrust pulsation acting between the permanent magnet 7 and the magnetic pole teeth. The needle 6 is equipped with multiple permanent magnets 7 so that the polarity is alternated between two adjacent magnetic poles and so that the magnetism is directed toward 2 FIG. 2.

When the needle 6 is held in the gap 8 between the upper and lower magnetic pole surfaces of the armature unit A and armature unit B by the support mechanisms 14 and 15, as shown in FIG. 2, and the armature coil 4 of the armature unit A and that of the armature unit B are excited alternately, the magnetic flux flows in the gap 8 between the upper magnetic pole surface and the lower magnetic pole surface in an alternate direction at every magnetic pole pitch. Thus, a thrust is generated as a result of P/2, which is essential for movement, and the needle 6 moves relatively.

As explained above, arranging two armature units in series results in a linear motor where the needle 6 moves relatively through a gap between the upper magnetic pole surface and lower magnetic pole surface of the armature units A and B. Although the foregoing explanation covers an arrangement of two armature units in series as shown in FIG. 4, the same applies to an arrangement of multiple armature units in series.

Figure 5:
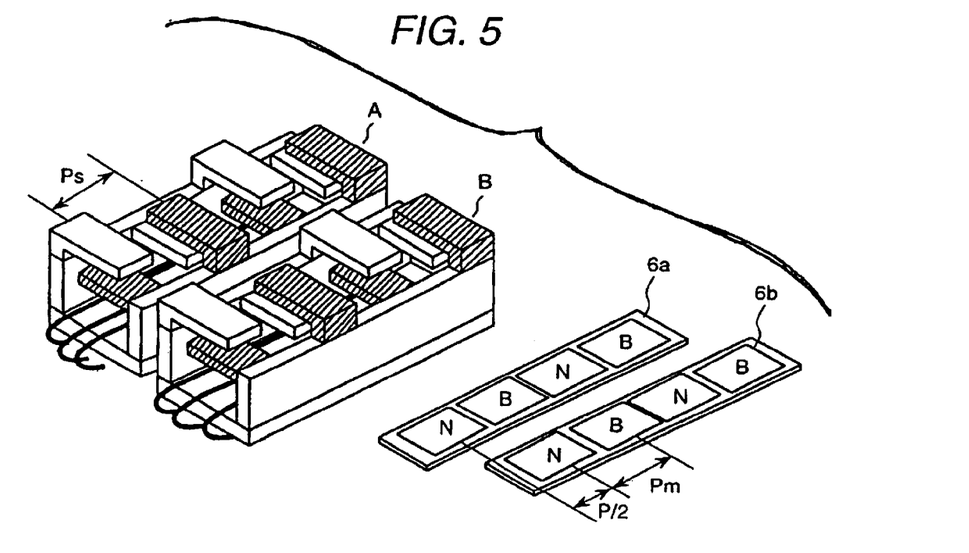
FIG. 5 is a perspective view of a linear motor comprising two armature units of the present invention in parallel.

FIG. 5 shows a linear motor comprising two of the armature units of FIG. 1 arranged in parallel. As shown in FIG. 5, the armature unit A and the armature unit B are arranged in parallel and completely alongside each other; each needle is equipped with multiple permanent magnets 7, so that the polarity is alternated between two adjacent magnetic poles; and the needle 6a and the needle 6b are combined into a piece. In doing this, the needle 6a is shifted from the needle 6b by a pitch of P/2. Relatively speaking, it is also permissible that the needle 6a and the needle 6b are integrated completely alongside, but that the armature unit A is shifted from the armature unit B by a pitch of P/2.

In the parallel arrangement in FIG. 5, the armature magnetic pole pitch Ps can be either equal to or different from the needle magnetic pole pitch Pm, as in the series arrangement in FIG. 4.

In a similar manner as in FIG. 4, when the needle 6a and needle 6b are held in the gap 8 between the upper and lower magnetic pole teeth of the armature unit A and armature unit B, respectively, by the support mechanisms 14 and 15, as shown in FIG. 2, and the armature coil 4 of the armature unit A and that of the armature unit B are excited alternately, a magnetic flux flows in the gap 8 between the upper magnetic pole surface and the lower magnetic pole surface in an alternate direction at every magnetic pole pitch. Thus, a thrust is generated as a result of P/2, which is essential for movement, and the needle 6 moves relatively.

As explained above, arranging two armature units in parallel and combining two needles into a piece results in a linear motor where the needle 6a and needle 6b move relatively through a gap between the upper magnetic pole surface and lower magnetic pole surface of the armature units A and B, respectively.

Although the foregoing explanation covers an arrangement of two armature units in parallel and the combination of two needles into a piece, as shown in FIG. 5, the same applies to an arrangement of multiple armature units in parallel and the combination of multiple needles into a piece.

In an arrangement of multiple armature units in series or in parallel, if the armature units or needles are combined into a piece so that the pitch either between the magnetic pole teeth of two adjacent armature units or between the magnetic poles of two adjacent needles is (K·P+P/M) {(K=0, 1, 2, . . . ), (M=2, 3, 4, . . . )} as explained above, each can move relatively, where P represents the magnetic pole pitch and M represents the phase of the motor.

Figure 6A:
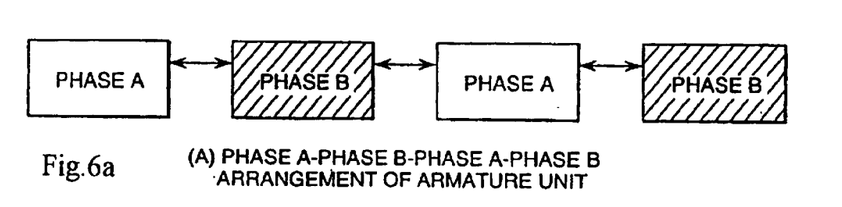
FIGS. 6(A) and 6(B) are a schematic diagrams showing aeries arrangements of armature units according to another embodiment of the present invention.
Figure 6B:
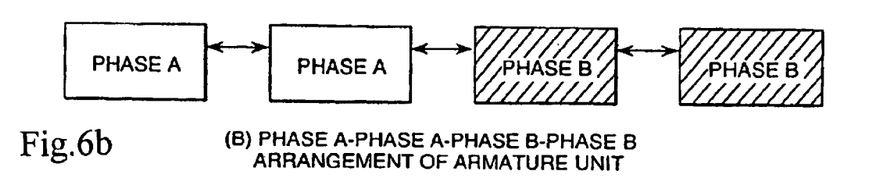

FIGS. 6(A) and 6(B) are schematic diagrams of series arrangement of armature units according to another embodiment of a two-phase linear motor of the present invention, wherein four armature units are arranged in series, of which pairs of armature units form one phase, and the magnetic pole tooth pitch between two adjacent armature units of the same phase is (K·P) {K=0, 1, 2, . . . } and the magnetic pole tooth pitch between two adjacent armature units of different phases is (K·P+P/M) {(K=0, 1, 2, . . . ), (M=2, 3, 4, . . . )} (K is an optional number not exceeding the maximum number of adjacent armature units to be installed, and M is the phase of the motor} provided that the magnetic pole pitch is P. FIG. 6(A) shows the Phase A-Phase B-Phase A-Phase B arrangement of the armature units. FIG. 6(B) shows the Phase A-Phase A-Phase B-Phase B arrangement of the armature units.

When multiple armature units are installed to form one phase as shown in FIGS. 6(A) and 6(B), greater thrust can be attained by the linear motor. Although FIGS. 6(A) and 6(B) cover a linear motor wherein four armature units are installed, of which pairs of armature units form one phase, the above explanation also applies to an arrangement of multiple armature units in series. The same applies to an arrangement of multiple armature units in parallel and the combination of multiple needles into a piece.

Figure 7:
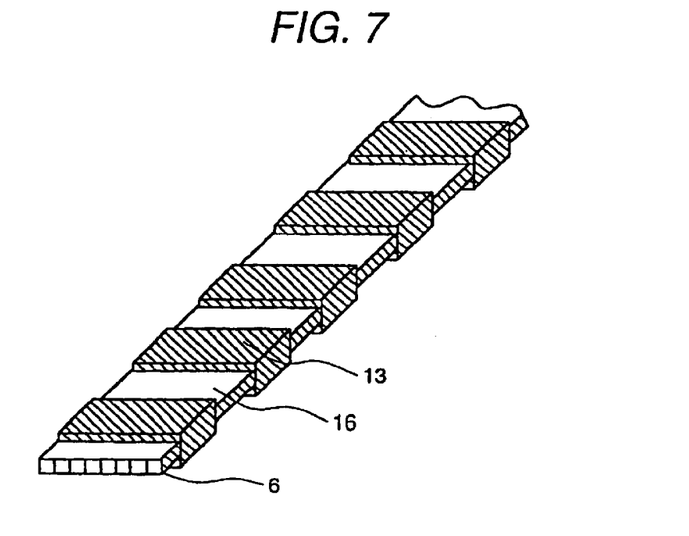
FIG. 7 is a schematic perspective view of a needle according to another embodiment of the present invention.

FIG. 7 shows another embodiment of the needle according to the present invention. The needle 6 in FIG. 1 is equipped with multiple permanent magnets 7 so that the polarity is alternated between two adjacent magnetic poles. The needle 6 in FIG. 7, however, employs a flat ferromagnetic material instead of the permanent magnets 7, and a raised magnetic pole tooth 13 is provided at a constant interval on both sides of the ferromagnetic material.

When raised magnetic pole teeth 13 are provided on both sides of the ferromagnetic material, the magnetic resistance between the armature and the magnetic pole surface varies. That is, the magnetic resistance between the raised magnetic pole tooth 13 and the magnetic pole surface of the armature is lower than the magnetic resistance between the flat section 16 of the ferromagnetic material and the magnetic pole surface of the armature. By utilizing this variation of the magnetic resistance, a freely moving needle can be obtained.

In the above construction, it is possible for the raised magnetic pole teeth 13 to be made of a ferromagnetic material and the flat sections 16 to be made of a permanent magnet, forming a combined needle. It is also possible to combine the raised magnetic pole teeth 13 made of ferromagnetic material with the flat sections 16 made of non-magnetic material.

Figures 8A, 8B:
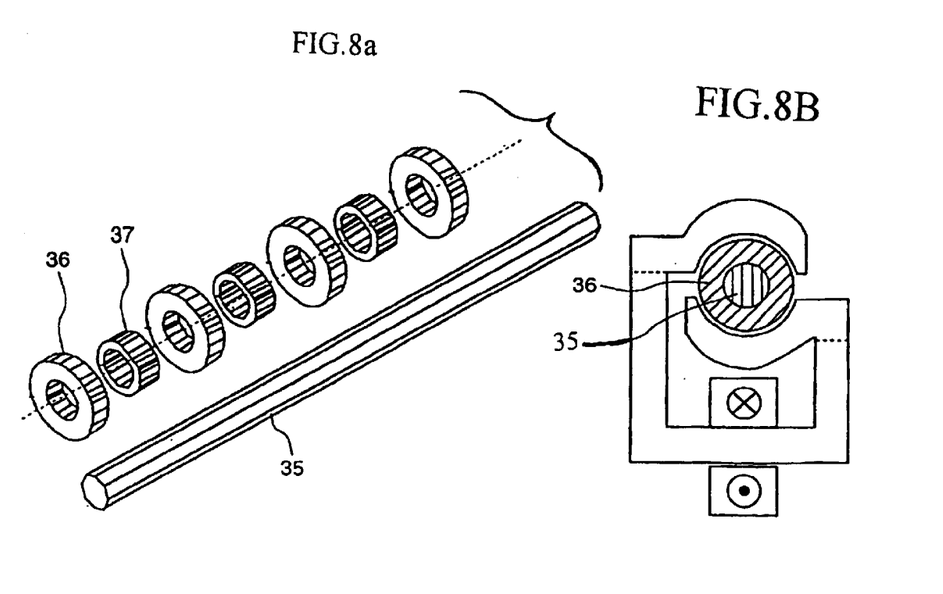
FIG. 8A is a schematic perspective of needle according to another embodiment of the present invention.
FIG. 8B is a sectional view of the linear motor.

FIG. 8(A) shows an example in which the flat needle in FIG. 7 is made into a tubular needle. Ferromagnetic materials 36 and non-magnetic materials 37 are combined on a shaft 35. Permanent magnets can also be employed.

Figure 9:
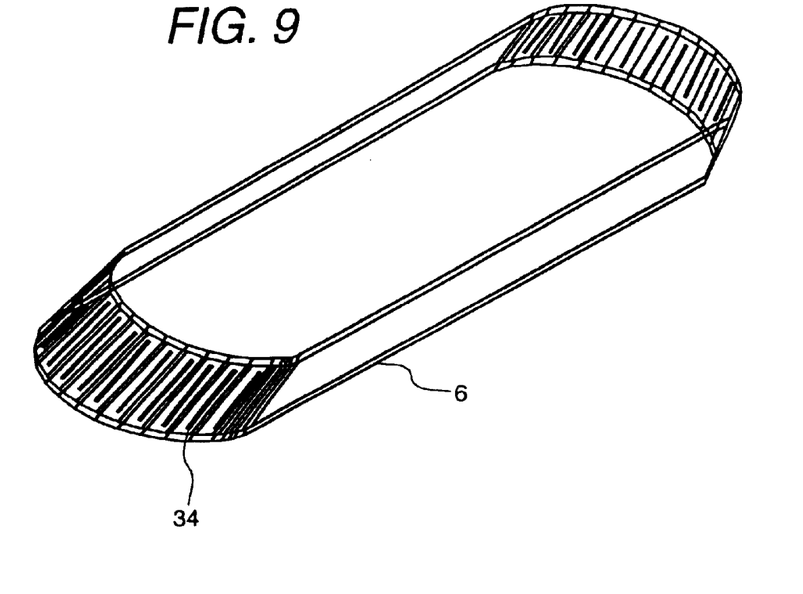
FIG. 9 is a schematic perspective view of a needle according to another embodiment of the present invention.

FIG. 9 shows another embodiment of the needle according to the present invention. In FIG. 9, the needle 9 is constructed into an endless belt or chain in which the ferromagnetic materials 34 are embedded. A permanent magnet can be employed instead of the ferromagnetic material.

A method of manufacturing a linear motor according to the present invention will be explained hereunder.

Figure 10:
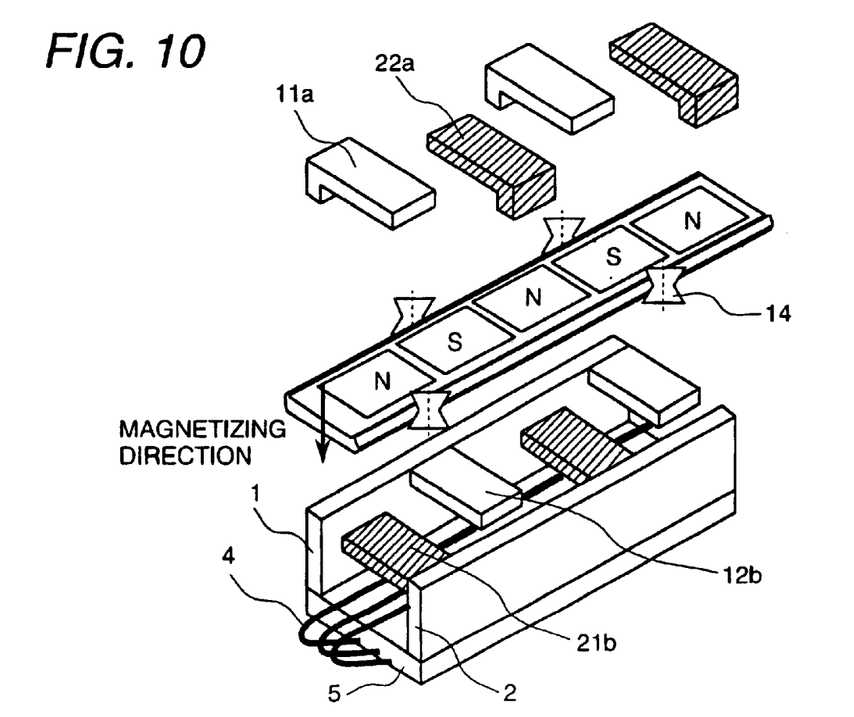
FIG. 10 is an exploded view showing a method of manufacture of a of linear motor according to the present invention.

FIG. 10 is an exploded view of the linear motor of FIG. 1. Each of the magnetic poles 1 and 2 and magnetic pole teeth 11a, 12b, 21b, and 22a is manufactured separately, and the magnetic pole 1 and magnetic pole teeth 11a and 12b are put together and the magnetic pole 2 and magnetic pole teeth 12b and 22a are also put together, forming an armature unit. For this, it is possible to press out the magnetic pole and upper and lower magnetic pole teeth for each side In one piece and assemble the two sides together into a unit. It is also possible to press out all the magnetic poles and upper and lower magnetic pole teeth for two sides in one piece.

The support mechanism (on the armature side) 14, mounted on the armature unit, supports the needle vertically and horizontally.

Figure 11:
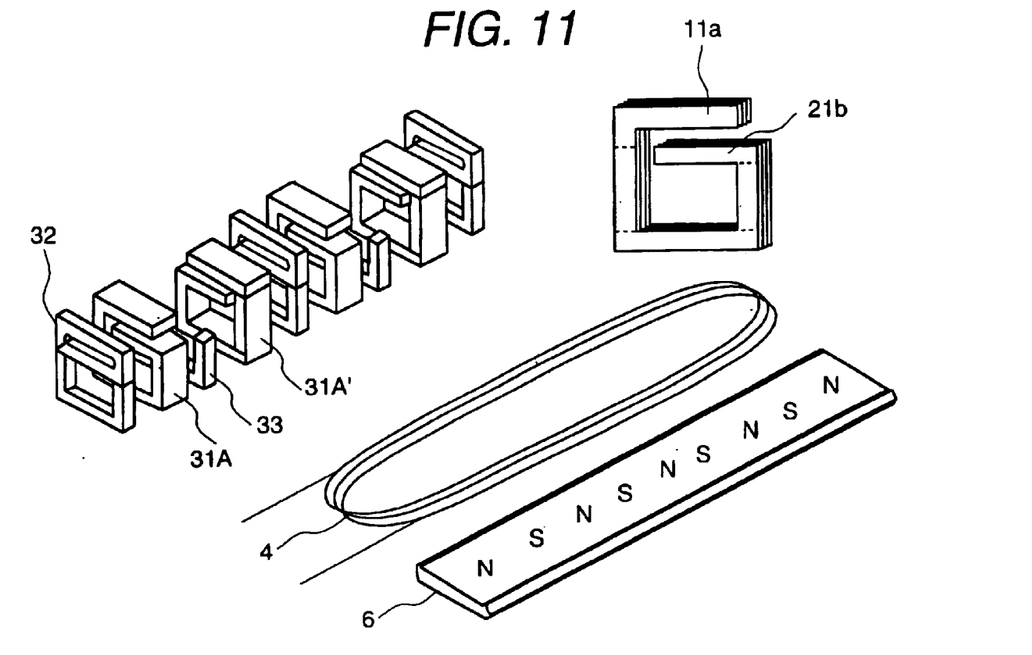
FIG. 11 is an exploded view showing another method of manufacture of a linear motor according to the present invention.

FIG. 11 is an exploded view which shows another method of manufacture of a linear motor according to the present invention. With this manufacturing method, a magnetic pole unit 31A, comprising an armature core to be wound with a coil 4, magnetic poles on both sides, an upper magnetic pole tooth 11a, and an opposing lower magnetic pole tooth 21b, is manufactured in one piece from laminated steel plate.

The magnetic pole unit 31A installed to an opposite orientation serves as the other magnetic pole unit 31A'. A support structure 32 and a duct 33 are installed between the magnetic pole unit 31A and the other magnetic pole unit 31A'. As a result, the armature is so constructed that the (2n−1)-th unit is the magnetic pole unit 31A corresponding to the first opposing section and the (2n)-th unit is the other magnetic pole unit 31A' corresponding to the second opposing section.

It is also possible to manufacture the magnetic pole units 31A and 31A' separately in a right-hand half and a left-hand half and assemble the halves together into a unit so as to sandwich the coil 4 from both sides.

Although a preferred embodiment of the present invention has been explained above with reference to a linear motor, the needle and armature unit of the present embodiment are also applicable to a vibration type linear actuator in which the needle moves relatively in reciprocation as DC current is supplied to the coil of the armature unit.

According to the present invention, as explained above, the magnetic path of a magnetic circuit of effective fluxes becomes shorter, and, accordingly, magnetic flux leakage can be reduced.

Besides, as a result of the fact that the overall attraction forces between the needle and the armature, acting perpendicularly to the moving direction of the needle, cancel each other to zero, the attraction force between the needle and the magnetic pole surface of the armature can be reduced, and, accordingly, the burden on the support mechanisms can be minimized.

In addition, the armature according to the present invention can be manufactured easily and effectively by manufacturing an armature unit in separate pieces, wherein a magnetic pole unit, comprising an armature core to be wound with a coil, magnetic poles on both sides, an upper magnetic pole tooth, and an opposing lower magnetic pole tooth, is manufactured in one piece from laminated steel plate.

What is claimed is:

1. A linear motor comprising an armature made of magnetic material, a coil wound on the armature, and a needle that moves relatively to the armature by acting upon the magnetic field generated by the armature, further comprising:

rows of magnetic pole teeth on one side which are magnetically connected to one magnetic pole of the armature and arranged at two stages, first and second, nearly perpendicular to the moving direction of the needle; and rows of magnetic pole teeth on the other side which are magnetically connected to the other magnetic pole of the armature and arranged at two stages, first and second, nearly perpendicular to the moving direction of the needle;

wherein a first-stage tooth of the magnetic pole teeth on one side and a first-stage tooth of the magnetic pole teeth on the other side are arranged alternately along the moving direction of the needle;

a second-stage tooth of the magnetic pole teeth on one side and a second-stage tooth of the magnetic pole teeth on the other side are arranged alternately along the moving direction of the needle; and the needle is put between the first-stage magnetic pole teeth of both sides and the second-stage magnetic pole teeth of both sides.

2. A linear motor according to claim 1, wherein the magnetic pole tooth pitch of the armature unit comprising the armature, coil and magnetic pole teeth on both sides is either equal to or different from the magnetic pole pitch of the needle.

3. A linear motor according to claim 1, wherein, when multiple armature units comprising the armature, coil and magnetic pole teeth on both sides are installed, of which two or more armature units form one phase, and a magnetic pole pitch is assumed to be P, the magnetic pole tooth pitch between two adjacent armature units of the same phase is $(k \cdot P)$ $\{k=0, 1, 2, \ldots\}$ and the magnetic pole tooth pitch between two adjacent armature units of different phases is $(k \cdot P + P/M)$ $\{(k=0, 1, 2, \ldots), (M=2, 3, 4, \ldots)\}$ $\{k$ is an optional number not exceeding a maximum number of adjacent armature units to be installed, and M is a phase of the linear motor$\}$.

4. A linear motor according to claim 3, wherein the magnetic pole tooth pitch of the armature unit comprising the armature, coil and magnetic pole teeth on both sides is either equal to or different from the magnetic pole pitch of the needle.

5. A linear motor according to claim 1, wherein, when multiple armature units comprising the armature, coil and magnetic pole teeth on both sides are installed and a magnetic pole pitch is assumed to be P, the magnetic pole tooth pitch between two adjacent armature units is $(k \cdot P + P/M)$ $\{(K=0, 1, 2, \ldots), (M=2, 3, 4, \ldots)\}$ $\{k$ is an optional number not exceeding a maximum number of adjacent armature units to be installed, and M is a phase of the linear motor$\}$.

6. A linear motor according to claim 5, wherein, when multiple armature units comprising the armature, coil and magnetic pole teeth on both sides are installed, of which two or more armature units form one phase, and a magnetic pole pitch is assumed to be P, the magnetic pole tooth pitch between two adjacent armature units of the same phase is $(k \cdot P)$ $\{k=0, 1, 2, \ldots\}$ and the magnetic pole tooth pitch between two adjacent armature units of different phases is $(k \cdot P + P/M)$ $\{(k=0, 1, 2, \ldots), (M=2, 3, 4, \ldots)\}$ $\{k$ is an optional number not exceeding a maximum number of adjacent armature units to be installed, and M is a phase of the linear motor$\}$.

7. A linear motor according to claim 5, wherein the magnetic pole tooth pitch of the armature unit comprising the armature, coil and magnetic pole teeth on both sides is either equal to or different from the magnetic pole pitch of the needle.

8. A linear motor according to claim 1, wherein an armature unit integrated from the armature core, magnetic poles, and magnetic pole teeth in one piece is manufactured separately from a laminated steel plate and the armature is constructed by combining the separately manufactured armature unit and the coil.

9. A linear motor comprising an armature made of magnetic material, a coil wound on the armature, and a needle acting upon the magnetic field generated by the armature, the needle being supported fixedly and the armature being movable relatively, further comprising:

rows of magnetic pole teeth on one side which are magnetically connected to one magnetic pole of the armature and arranged at two stages, first and second, nearly perpendicular to the moving direction of the needle; and rows of magnetic pole teeth on the other side which are magnetically connected to the other magnetic pole of the armature and arranged at two stages, first and second, nearly perpendicular to the moving direction of the needle;

wherein a first-stage tooth of the magnetic pole teeth on one side and a first-stage tooth of the magnetic pole teeth on the other side are arranged alternately along the moving direction of the armature;

a second-stage tooth of the magnetic pole teeth on one side and a second-stage tooth of the magnetic pole teeth on the other side are arranged alternately along the moving direction of the armature; and the needle is put between the first-stage magnetic pole teeth of both sides and the second-stage magnetic pole teeth of both sides.

10. A linear motor according to claim 9, wherein an armature unit integrated from the armature core, magnetic poles, and magnetic pole teeth in one piece is manufactured separately from laminated steel plate and the armature is constructed by combining the separately manufactured armature unit and the coil.

* * * * *